(12) United States Patent  
Hillen et al.

(10) Patent No.: US 10,219,439 B1  
(45) Date of Patent: Mar. 5, 2019

(54) HARVESTER CLEANING SYSTEM WITH CONVEYOR ENHANCED CASCADES

(71) Applicant: CNH Industrial America LLC, New Holland, PA (US)

(72) Inventors: Curtis Frederick Hillen, Lititz, PA (US); Jonathan Eugene Ricketts, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/676,270

(22) Filed: Aug. 14, 2017

(51) Int. Cl.
| | |
|---|---|
| *A01F 12/385* | (2006.01) |
| *A01F 12/44* | (2006.01) |
| *A01F 12/46* | (2006.01) |
| *A01F 12/18* | (2006.01) |
| *A01D 41/12* | (2006.01) |

(52) U.S. Cl.
CPC .......... *A01F 12/385* (2013.01); *A01F 12/444* (2013.01); *A01F 12/446* (2013.01); *A01F 12/46* (2013.01); *A01D 41/12* (2013.01); *A01F 12/18* (2013.01)

(58) Field of Classification Search
CPC ...... A01F 12/444; A01F 12/446; A01F 12/44; A01F 12/46; A01F 12/00; A01F 12/442; A01D 41/12; A01D 41/1276; A01D 41/00
USPC .......................................... 460/100, 99, 101
See application file for complete search history.

(56) References Cited

U.S. PATENT DOCUMENTS

| | | | |
|---|---|---|---|
| 544,044 A | 8/1895 | Landis | |
| 684,855 A | 10/1901 | Owens | |
| 1,864,772 A * | 6/1932 | Sprague | A01F 12/44 460/86 |
| 2,303,249 A * | 11/1942 | Ashton | A01F 12/44 209/151 |
| 2,589,440 A * | 3/1952 | Sharpe | A01F 7/04 460/100 |
| 2,670,845 A * | 3/1954 | Busack | A01F 12/44 209/26 |
| 2,937,647 A * | 5/1960 | Allen | A01F 12/44 460/85 |

(Continued)

FOREIGN PATENT DOCUMENTS

| | | |
|---|---|---|
| DE | 8221573 U1 | 1/1986 |
| DE | 8221573 U1 | 1/1986 |

(Continued)

OTHER PUBLICATIONS

European Search Report for EP Application No. 18186323.4 dated Jan. 11, 2019 (6 pages).

*Primary Examiner* — Arpad Fabian-Kovacs

(74) *Attorney, Agent, or Firm* — Peter K. Zacharias; Patrick M. Sheldrake

(57) ABSTRACT

A preparation section of a combine harvester that is configured to receive a mixture of grain and material other than grain (MOG) from a threshing section of the combine harvester. The preparation section includes a conveyor positioned beneath the threshing section that is configured to transport the grain and MOG in a downstream direction toward a cleaning section, and a deflector positioned at a downstream end of a conveyor that is configured to launch the grain and MOG into the air and cause at least partial separation of the MOG and grain prior to falling onto the cleaning section.

21 Claims, 3 Drawing Sheets

(56) References Cited

U.S. PATENT DOCUMENTS

| | | | | |
|---|---|---|---|---|
| 3,092,116 A * | 6/1963 | Stroburg | ............... | A01D 75/282 |
| | | | | 198/606 |
| 3,603,063 A * | 9/1971 | Stroburg | ............... | A01F 12/444 |
| | | | | 460/109 |
| 3,827,443 A * | 8/1974 | Drayer | .................... | A01F 12/00 |
| | | | | 460/16 |
| 4,250,897 A * | 2/1981 | Glaser | .................... | A01D 67/00 |
| | | | | 415/7 |
| 4,353,376 A * | 10/1982 | Schuler | .................... | A01F 12/44 |
| | | | | 460/67 |
| 4,480,643 A * | 11/1984 | Alm | ...................... | A01F 12/446 |
| | | | | 460/120 |
| 4,531,528 A | 7/1985 | Peters et al. | | |
| 4,821,744 A | 4/1989 | Turner et al. | | |
| 5,769,712 A * | 6/1998 | Honas | ................... | A01F 12/442 |
| | | | | 460/114 |
| 6,435,965 B2 * | 8/2002 | Visagie | ................... | A01F 12/00 |
| | | | | 460/143 |
| 6,773,343 B2 * | 8/2004 | Grywacheski | ........ | A01F 12/444 |
| | | | | 460/100 |
| 7,297,052 B2 * | 11/2007 | Maertens | ........... | A01D 41/1276 |
| | | | | 460/101 |
| 7,413,507 B2 * | 8/2008 | Weichholdt | ........... | A01F 12/446 |
| | | | | 460/100 |
| 7,566,266 B1 * | 7/2009 | Ricketts | ................... | A01F 11/06 |
| | | | | 460/101 |
| 8,282,453 B1 | 10/2012 | Hillen et al. | | |
| 8,286,984 B2 * | 10/2012 | Dillon | ................ | A01D 41/1208 |
| | | | | 280/419 |
| 8,801,512 B2 * | 8/2014 | Biggerstaff | ............. | A01F 12/58 |
| | | | | 460/99 |
| 9,078,397 B2 * | 7/2015 | Farley | ........................ | A01F 7/02 |
| 9,119,350 B2 | 9/2015 | Stan et al. | | |
| 9,462,752 B2 * | 10/2016 | Farley | .................... | A01F 12/446 |
| 9,625,306 B2 * | 4/2017 | Farley | .................... | G01G 11/02 |
| 9,686,918 B2 * | 6/2017 | Weeks | .................... | A01F 12/46 |
| 2005/0101363 A1 * | 5/2005 | Farley | .................... | A01D 41/1243 |
| | | | | 460/112 |
| 2006/0281506 A1 | 12/2006 | Weichholdt | | |
| 2006/0287019 A1 * | 12/2006 | Weichholdt | ........... | A01F 12/446 |
| | | | | 460/102 |
| 2007/0161422 A1 * | 7/2007 | Behnke | ............. | A01D 41/1276 |
| | | | | 460/1 |
| 2014/0066145 A1 * | 3/2014 | Bilde | .................... | A01F 12/444 |
| | | | | 460/91 |
| 2016/0135372 A1 | 5/2016 | Bonte et al. | | |
| 2016/0192591 A1 * | 7/2016 | Missotten | .................... | A01F 12/444 |
| | | | | 460/100 |
| 2016/0316627 A1 * | 11/2016 | Brockel | .................... | A01D 61/00 |
| 2016/0316635 A1 * | 11/2016 | Murray | .................... | A01D 41/00 |
| 2016/0345499 A1 * | 12/2016 | Van Hullebusch | ....... | A01F 7/06 |
| 2016/0345500 A1 * | 12/2016 | Duquesne | ............ | A01F 12/444 |
| 2016/0360701 A1 * | 12/2016 | Weeks | .................... | A01D 61/008 |
| 2017/0006764 A1 * | 1/2017 | Farley | .................... | A01B 76/00 |

FOREIGN PATENT DOCUMENTS

| | | |
|---|---|---|
| EP | 3158854 A1 | 4/2017 |
| GB | 1075906 A | 7/1967 |
| WO | WO 8100503 A1 | 3/1981 |
| WO | WO-2012/097933 A1 | 7/2012 |
| WO | WO-2014/082890 A1 | 6/2014 |

* cited by examiner

HARVESTER CLEANING SYSTEM WITH CONVEYOR ENHANCED CASCADES

FIELD OF THE INVENTION

The present invention is related to combine harvesters for gathering and processing crop material from a field, in particular to systems for preparing the crop mixture received from the threshing rotors and transporting said mixture towards a cleaning section.

BACKGROUND OF THE INVENTION

As described in U.S. Patent App. Pub. No. 2016/0135372 to CNH America LLC, which is incorporated by reference herein in its entirety, combine harvesters are typically equipped with a preparation section and a cleaning section. The terms combine harvester, combine and harvester may be used interchangeable herein. The preparation section is located underneath the threshing drums of the harvester and receives a mixture of grain and material other than grain (MOG) from which the grain needs to be further separated. The function of the preparation section is to move the mixture progressively towards the cleaning section, the latter comprising a set of sieves, configured to sieve the mixture and to obtain the separated grains that fall through the sieves, while heavier MOG is collected at the rear of the sieves and lighter MOG is blown towards the rear by a blower producing an air stream in between the sieves.

The preparation section that is most widely applied is the reciprocating grain pan, which is arranged to oscillate backwards and forwards in the longitudinal direction of the harvester so as to move the mixture towards the cleaning section. This setup has the advantage that it uses the differing densities of grain vs. MOG in combination with a reciprocating motion to stratify the mixture with denser grain moving to the bottom of the mixture and lighter MOG material moving toward the top, thus partially pre-separating the MOG from the grain before delivering it to the sieves. On the other hand, the reciprocating grain pan is a relatively passive means of transport, and is therefore subject to negative effects on conveyance due to gravity when harvesting on hilly terrain.

Another known separation means comes in the form of an auger bed, which is composed of a plurality of augers oriented generally in the longitudinal direction of the machine. These augers convey the mixture from the threshing chamber to the sieves with relatively little effect from machine inclination. The augers also deliver a nearly constant flow of material to the sieves, unlike the grain pan which demonstrates a more cyclic sloughing of material in time with its reciprocating motion. The disadvantage of an auger bed system is that the rotating augers tend to mix the grain and MOG components as they convey the material creating a mixture that is more difficult to clean.

The use of multiple preparation stages with a separate blower means aiming an air stream at the gaps between subsequent stages is known, for example from WO-A-8100503 or DE8221573U1. Due to the relatively large size of the gaps, a portion of the mixture is in danger of being lost by falling through the gaps. Despite the air stream directed at the gap, part of the mixture may initially move in the backward direction when falling from one stage onto the next, especially when the preparation stages are formed or comprise at least one reciprocating grain pan. This may be the cause of significant losses.

Referring now to the prior art figures, which are reproduced from U.S. Patent App. Pub. No. 2016/0135372 to CNH America LLC, FIG. 1 shows a number of relevant components in a combine harvester including a preparation section that prepares the crop mixture received from the threshing rotors and transports said mixture towards a cleaning section. The threshing rotors 1, which are shown schematically, are shown oriented in the longitudinal direction of the harvester. Detailed views of the threshing rotors are shown, for example, in U.S. Pat. No. 8,282,453 to CNH America LLC, which is incorporated by reference herein in its entirety and for all purposes.

The cleaning section of the harvester comprises a main blower 10 and a set of sieves 20. The main blower 10 is mounted in a manner known as such in the art, for blowing an air stream in between the sieves 20, to thereby blow light MOG material towards the rear of the harvester. Underneath the rotors 1 and upstream of the main blower 10 and the sieves 20, a first preparation pan 2 is mounted, inclined slightly upward with respect to the horizontal direction. The pan 2 has a front edge 3 and a rear (downstream) edge 4 and is connected to a suitable mechanism for actuating a reciprocating movement of the pan, configured to move a mixture of grains and MOG towards the rear edge of the pan, in a manner known as such in the art.

Fixed to the pan 2, and oriented downwards, is a plate 5, provided with upwardly tilted or horizontal fins 6, placed transversally with respect to the harvester's longitudinal direction. Material that advances beyond the rear edge 4 of the first pan 2 falls onto the first fin 6', thereby crossing a gap 7. As the plate 5 is fixed to the pan 2, it undergoes the same reciprocating movement, so that the grain mixture is progressively transported from the first fin 6' to the second fin 6" and so on until the rear edge of the plate 5, each time crossing a gap 7 when moving from one fin to the next. Between each pair of fins, the plate 5 is provided with a slit or a row of holes, or generally any suitable kind of openings 8, allowing the passage of an air stream or air blasts originating from a fan 15 and directed towards the gaps 7. The fan 15 is separate and configured to work independently from the main blower 10. The fan 15 thus represents the independent blower means referred to above. The fan 15 is mounted upstream of the gaps 7 that are present between each pair of consecutive fins 6, and configured to produce an air stream or blasts of air in the direction of the gaps, thereby blowing lighter MOG material from the mixture towards the rear of the harvester, while the heavier grains are maintained on the fins 6.

The fan 15 may, for example, be fixed to the first preparation pan 2, or to the chassis of the harvester. The fan 15 may be mounted in close proximity to the first of the gaps 7, as illustrated in FIG. 1, or it may be placed more upstream, possibly with suitable air guide panels mounted to guide the air from the fan towards the gaps 7. The air stream or blasts produced by the fan 15 are configured to blow lighter MOG towards the rear of the harvester and thereby establish a separation of the mixture prior to the point where the mixture is delivered to the sieves 20. At the rear edge of the plate 5, the mixture is delivered to the sieves 20 of the cleaning section and treated further in the manner known in the art.

The plate 5 makes it possible to provide multiple preparation stages over a short distance, each fin 6 representing a preparation stage, with the grain mixture moving from the front edge of a fin to the rear edge before falling onto the next fin. Every time the mixture falls from one fin onto the next, the air produced by the blower 15 is capable of blowing light MOG material towards the back of the harvester. This facilitates a more thorough pre-cleaning of the mixture. The plate 5 is downwardly oriented as seen in the direction from the front of the harvester to the back, so that the front edge of a fin is located underneath the rear edge of the previous fin. The fins 6 as such are horizontally or slightly upwardly oriented, as shown in the drawings, so as to support the mixture. The fins are preferably overlapping to a degree, i.e. the rear edge of a fin extends beyond the front edge of a subsequent fin.

The size of the openings or slits 8 is configured to allow the passage of air from the fan 15, whilst obstructing the passage of grains and MOG from the mixture that is being carried by the fins 6. In this way, it may not be possible for grain or MOG to 'fall through' the gaps 7 in the direction opposite the general direction of movement of the mixture. Even when the holes or slits 8 would allow small particles of the mixture to pass through the holes, any significant flow of material through the gaps 7 is obstructed by the presence of the plate 5. This ensures transport of the mixture with less mixture losses compared to existing systems. Openings 8 are preferably present between each pair of consecutive fins 6.

The plate 5 can be used in combination with other types of grain preparation stages known in the art, such as a conveyor belt 30, as illustrated in FIG. 2.

While the preparation section of the prior art harvester shown in FIGS. 1 and 2 offer advantages over other prior art preparation sections, improvements are continually sought in the separation of grain from material other than grain (MOG) as the grain and MOG mixture is transported from the threshing chamber to the cleaning system.

SUMMARY OF THE INVENTION

According to one aspect of the invention, a preparation section of a combine harvester is configured to receive a mixture of grain and material other than grain (MOG) from a threshing section of the combine harvester. The preparation section comprises a conveyor, which is positioned beneath the threshing section, that is configured to transport the grain and MOG in a downstream direction toward a cleaning section; and a deflector positioned at a downstream end of the conveyor, the deflector having a sloping surface that slopes upward in a downstream direction, a downstream end of the sloping surface being positioned at a higher elevation than a downstream end of the conveyor in order to launch the grain and MOG into the air and cause at least partial separation of the MOG and grain prior to falling onto the cleaning section.

According to another aspect of the invention, a combine harvester comprises a threshing section that is configured to thresh grain from material other than grain (MOG), a preparation section positioned to receive a mixture of the grain and MOG from the threshing section, and a cleaning section. The preparation section comprises (i) a first conveyor positioned beneath the threshing section that is configured to transport the grain and MOG in a downstream direction, and (ii) a second conveyor that is positioned beneath the threshing section and downstream of the first conveyor, the second conveyor being configured to transport the grain and MOG in a downstream direction. The cleaning section is configured to receive the grain and MOG from the second conveyor of the preparation section.

According to yet another aspect of the invention, a combine harvester comprises a threshing section that is configured to thresh grain from material other than grain (MOG); a preparation section positioned to receive a mixture of the grain and MOG from the threshing section, and a cleaning section. The preparation section comprises (i) a first conveyor positioned beneath the threshing section that is configured to transport the grain and MOG in a downstream direction, (ii) a first deflector positioned at a downstream end of the first conveyor and having a ramp surface that is configured launch the grain and MOG into the air, (iii) a second conveyor that is positioned beneath the threshing section and downstream of the deflector, the second conveyor being configured to transport the grain and MOG in a downstream direction, and (iv) a second deflector positioned at a downstream end of the second conveyor and having an impact surface that is configured separate the grain from the MOG. The cleaning section is configured to receive the grain and MOG from the second deflector of the preparation section.

BRIEF DESCRIPTION OF THE DRAWINGS

For the purpose of illustration, there are shown in the drawings certain embodiments of the present invention. It should be understood, however, that the invention is not limited to the precise components, arrangements, dimensions, and instruments shown. Like numerals indicate like elements throughout the drawings. In the drawings.

DETAILED DESCRIPTION OF THE INVENTION

In general, aspects of the present invention relate to a work vehicle, particularly agricultural work vehicles such as a harvester combine. It should be appreciated, however, that the invention is not limited to a combine, or any other particular type of work vehicle. Aspects of the invention are described herein with reference to a combine for illustrative purposes only.

The terms ' upstream' and 'downstream' are to be understood in relation to the travel direction of crop materials in the combine, i.e. from the front of the combine to the back.

The detailed description is not limiting the scope of the invention, which is defined only by the appended claims.

Figure 3:
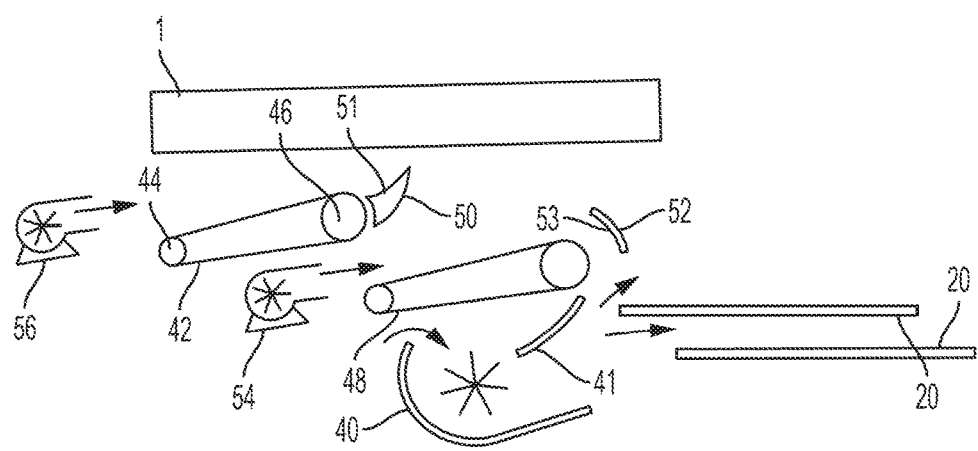
FIG. 3 depicts a schematic view of a number of relevant components in a harvester, according to the instant invention, including a preparation section comprising two belt conveyers and deflectors.

Referring now to the drawings, wherein like numbers refer to generally like items or features, FIG. 3 depicts a number of relevant components in a harvester, according to the instant invention, including a preparation section comprising two belt conveyers and deflectors.

Figure 1:
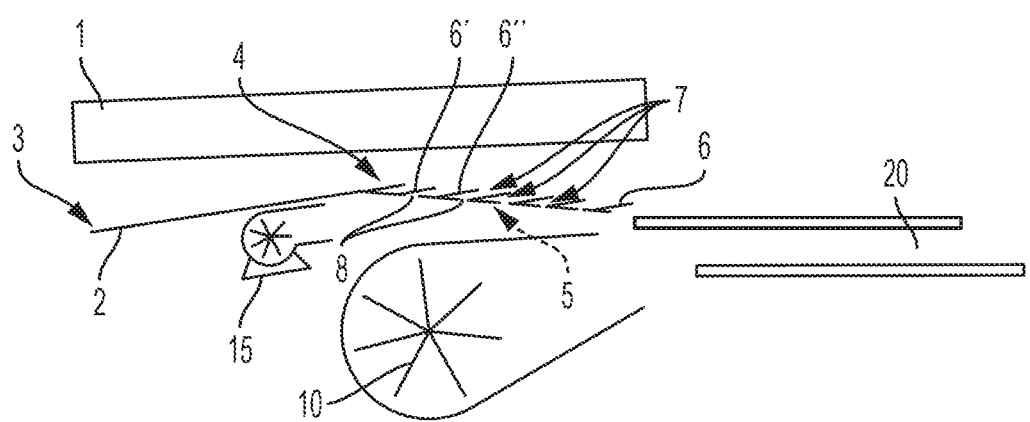
FIG. 1 depicts a schematic view of a number of relevant components in a harvester according to the prior art, wherein the preparation section comprises a reciprocating grain pan and a perforated plate provided with fins, said plate being attached to said preparation pan.
Figure 2:
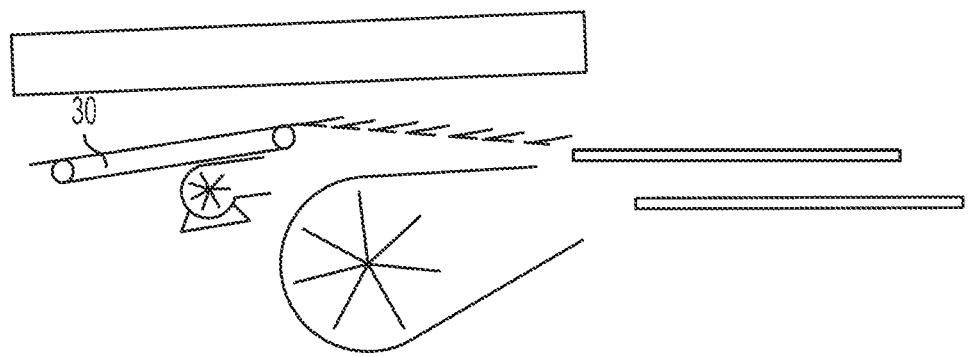
FIG. 2 depicts a schematic view of relevant components in another prior art harvester, wherein the preparation section comprises a belt conveyer and a perforated plate.

More particularly, like the harvester of FIGS. 1 and 2, the harvester of FIG. 3 includes the threshing section comprising rotors 1 oriented in the longitudinal direction of the harvester. The cleaning section of the harvester comprises a main blower 40 and a set of sieves 20 that are positioned downstream of the blower 40. The main blower 40 is mounted in a manner known as such in the art, for blowing an air stream in between the sieves 20, to thereby blow light MOG material towards the rear of the harvester. A divider 41 of the blower 40 separates the inlet and exhaust sections of the blower 40. The air streams created by the blower 40 are designated by arrows.

Unlike the harvester of FIGS. 1 and 2, the preparation section of the harvester of FIG. 3 generally includes two belt conveyers 42 and 48, and two deflectors 50 and 52, which will be described in detail hereinafter.

The first conveyor belt 42 is mounted beneath the rotors 1 and is positioned upstream of the main blower 40 and the sieves 20. The belt 42 has a front edge 44 and a rear (downstream) edge 46 and is connected to a suitable mechanism for actuating a reciprocating movement of the belt 42. The belt 42 is configured to move a mixture of grains and MOG falling from the rotors 1 downstream towards the rear edge 46 of the belt 42. The belt 42 is tilted slightly upward with respect to the horizontal direction such that the rear edge 46 is positioned at a higher elevation than the front edge 44.

The second conveyor belt 48 is mounted beneath the rotors 1, and is positioned downstream of the belt 42 and upstream of the outlet of the main blower 40 and the sieves 20. Operation and the tilted orientation of the second conveyor belt 48 is the same as that of the first conveyor belt 42. The second conveyor belt 48 is an optional component of the harvester, and may or may not be combined with the first conveyor belt 42.

The belts 42 and 48 could be replaced by a slat top conveyor chain or any other conveyor device that is known to those skilled in the art.

A deflector 50 is mounted downstream of the first conveyor belt 42. The deflector 50 is essentially a ramp that is configured to cause the grain and MOG to separate as they are launched into the air and downstream of the belt 42 by the deflector 50. The deflector 50 has an upwardly sloping surface 51, the terminal (downstream) end of which is positioned at an elevation that is higher than the rear edge 46 of the first conveyor belt 42. The deflector 50 may be mounted to the conveyor belt 42 or any other component of the harvester. The deflector 50 may be adjustable, however, it remains fixed in position during operation. The deflector 50 is an optional component of the harvester.

A deflector 52 is mounted downstream of the second conveyor belt 48. The deflector 52 is essentially a barrier that is configured to cause the grain and MOG to separate as they impact the surface 53, as will be described in greater detail later. The top end of the deflector 52 is positioned at an elevation that is higher than the rear edge of the second conveyor belt 48. The deflector 52 may be mounted to the conveyor belt 48 or any other component of the harvester. The deflector 52 may be adjustable, however, it remains fixed in position during operation. The deflector 52 is an optional component of the harvester.

A secondary blower 56 is positioned upstream of the first conveyor belt 42 and is configured to deliver air in a downstream direction (as indicated by the arrow) above the first conveyor belt 42. Alternatively, in lieu of secondary blower 56, a conduit (not shown) could be connected to the primary blower 40 and positioned to deliver air in a downstream direction (as indicated by the arrow) above the first conveyor belt 42.

Similarly, a third blower 54 is positioned upstream of the second conveyor belt 48 and is configured to deliver air in a downstream direction above the second conveyor belt 48. Alternatively, in lieu of the third blower 54, a conduit (not shown) could be connected to the primary blower 40 (or the secondary blower 56) and positioned to deliver air in a downstream direction above the second conveyor belt 48.

In operation, threshed grain and MOG fall downward from the rotors 1. Some of the light weight MOG is blown downstream and out of the harvester by the second blower 56. The remaining grain and MOG fall onto the first conveyor belt 42 by gravity. The first conveyor belt 42 directs the grain and MOG in a downstream direction. Once the grain and MOG reach the rear edge 46 of the first conveyor belt 42 and travel over the deflector 50, the grain and MOG are launched back into the air for a significant duration of time. As the grain and MOG travel in the air, they separate as the heavier grain falls faster than the lighter weight MOG. As the grain and MOG travel in the air, again, some of the light weight MOG is blown downstream and out of the harvester by the third blower 54. The remaining grain and MOG fall onto the second conveyor belt 48 by gravity. The second conveyor belt 48 directs the grain and MOG in a downstream direction (i.e., toward sieves 20). Once the grain and MOG reach the rear edge of the second conveyor belt 48, they impact the surface 53 of the deflector 52. As the grain and MOG impact the deflector 52, they again separate as the heavier grain falls faster than the lighter weight MOG. A large portion of the grain will be thrown through to the sieve 20, whereas a large portion of the MOG will spill over the deflector 52. Also, as the grain feeds around the belt 48 and the deflector 52 skims the MOG, the grain is at high speed and allows air to move the MOG from the grain and the grain falls onto the sieves 20. Some of the light weight MOG is blown downstream and out of the harvester by the primary blower 40. The remaining MOG and grain land on the sieves 20. Due to the air stream provided by the primary blower 40 the layers of grain and MOG are stratified with the light weight MOG disposed above the heavier grain. Operation of the sieves is known to those skilled in the art.

The blowers 54 and 56 are configured to pre-separate the MOG from the grain in an effort to minimize the amount of MOG that reaches the sieves 20. Minimizing the amount of MOG that reaches the sieves 20 increases the capacity of the cleaning system.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A preparation section of a combine harvester that is configured to receive a mixture of grain and material other than grain (MOG) from a threshing section of the combine harvester, the preparation section comprising:
   a conveyor, which is positioned beneath the threshing section, that is configured to transport the grain and MOG in a downstream direction toward a cleaning section, and
   a deflector positioned at a downstream end of the conveyor, the deflector having a sloping surface that slopes upward in a downstream direction, a downstream end of the sloping surface being positioned at a higher elevation than a downstream end of the conveyor in order to launch the grain and MOG into the air and cause at least partial separation of the MOG and grain prior to falling onto the cleaning section,
   wherein the deflector is positioned downstream of the conveyor and upstream of the cleaning section to receive the grain and MOG from the conveyor before the grain and MOG reach the cleaning section.

2. The preparation section of claim 1, wherein the conveyor is tilted upwardly in the downstream direction.

3. The preparation section of claim 1 further comprising a blower positioned upstream of the conveyor for blowing the MOG on the conveyor in a downstream direction.

4. The preparation section of claim 1, wherein the sloping surface is a curved surface.

5. The preparation section of claim 1, further comprising a second conveyor that is positioned downstream of the conveyor and upstream of the cleaning section.

6. The preparation section of claim 5, further comprising a second deflector positioned at a downstream end of the second conveyor, the second deflector being configured to redirect the grain and MOG downward onto the cleaning section.

7. The preparation section of claim 6, further comprising a blower positioned upstream of the second conveyor for blowing the MOG falling between the conveyor and the second conveyor in a downstream direction.

8. The combine harvester of claim 1 further comprising the cleaning section, and wherein the cleaning section comprises sieves.

9. A combine harvester comprising:
a threshing section that is configured to thresh grain from material other than grain (MOG);
a preparation section positioned to receive a mixture of the grain and MOG from the threshing section, the preparation section comprising (i) a first conveyor positioned beneath the threshing section that is configured to transport the grain and MOG in a downstream direction, and (ii) a second conveyor that is positioned beneath the threshing section, at least partially beneath the first conveyor for receiving the grain and MOG from the first conveyor, and downstream of the first conveyor, the second conveyor being configured to transport the grain and MOG in a downstream direction; and
a cleaning section configured to receive the grain and MOG from the second conveyor of the preparation section.

10. The combine harvester of claim 9 further comprising a first deflector positioned at a downstream end of the first conveyor, the first deflector having a sloping surface that slopes upward in a downstream direction, a downstream end of the sloping surface being positioned at a higher elevation than a downstream end of the first conveyor in order to launch the grain and MOG into the air and cause at least partial separation of the MOG and grain prior to falling onto the second conveyor.

11. The combine harvester of claim 10 further comprising a second deflector positioned at a downstream end of the second conveyor, the second deflector being configured to redirect the grain and MOG downward onto the cleaning section.

12. The combine harvester of claim 11 further comprising a blower positioned upstream of the first conveyor for blowing the MOG on the first conveyor in a downstream direction.

13. The combine harvester of claim 9 further comprising a blower positioned upstream of the second conveyor for blowing the MOG falling between the first conveyor and the second conveyor in a downstream direction.

14. The combine harvester of claim 9 further comprising a blower positioned beneath the second conveyor for blowing the MOG falling between the second conveyor and the cleaning section in a downstream direction.

15. The combine harvester of claim 9, wherein the threshing section comprises a rotor, and the first conveyor is positioned beneath the rotor.

16. The combine harvester of claim 9, wherein the conveyors are tilted upwardly in the downstream direction.

17. A combine harvester comprising:
a threshing section that is configured to thresh grain from material other than grain (MOG);
a preparation section positioned to receive a mixture of the grain and MOG from the threshing section, the preparation section comprising (i) a first conveyor positioned beneath the threshing section that is configured to transport the grain and MOG in a downstream direction, (ii) a first deflector positioned at a downstream end of the first conveyor and having a ramp surface that is configured launch the grain and MOG into the air, (iii) a second conveyor that is positioned beneath the threshing section and downstream of the deflector, the second conveyor being configured to transport the grain and MOG in a downstream direction, and (iv) a second deflector positioned at a downstream end of the second conveyor and having an impact surface that is configured separate the grain from the MOG; and
a cleaning section configured to receive the grain and MOG from the second deflector of the preparation section,
wherein the first deflector is positioned downstream of the first conveyor and upstream of the cleaning section to receive the grain and MOG from the first conveyor before the grain and MOG reach the cleaning section, and the second deflector is positioned downstream of the second conveyor and upstream of the cleaning section to receive the grain and MOG from the second conveyor before the grain and MOG reach the cleaning section.

18. The combine harvester of claim 17, wherein a downstream end of the ramp surface is positioned at a higher elevation than a downstream end of the first conveyor.

19. The combine harvester of claim 17, wherein the cleaning section comprises sieves.

20. The combine harvester of claim 17 further comprising a blower positioned upstream of the first conveyor for blowing the MOG on the first conveyor in a downstream direction.

21. The combine harvester of claim 17 further comprising a blower positioned upstream of the second conveyor for blowing the MOG falling between the first conveyor and the second conveyor in a downstream direction.

* * * * *